US008566886B2

(12) United States Patent
Scholl

(10) Patent No.: US 8,566,886 B2
(45) Date of Patent: *Oct. 22, 2013

(54) PASSIVE VIDEO CACHING FOR EDGE AGGREGATION DEVICES

(75) Inventor: Thomas Bradley Scholl, New Haven, CT (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 240 days.

This patent is subject to a terminal disclaimer.

(21) Appl. No.: 13/216,566

(22) Filed: Aug. 24, 2011

(65) Prior Publication Data
US 2011/0314508 A1 Dec. 22, 2011

Related U.S. Application Data

(63) Continuation of application No. 11/444,554, filed on May 31, 2006, now Pat. No. 8,028,319.

(51) Int. Cl.
*H04N 7/173* (2011.01)
(52) U.S. Cl.
USPC ................................ 725/93; 725/86; 725/87
(58) Field of Classification Search
None
See application file for complete search history.

(56) References Cited

U.S. PATENT DOCUMENTS

| 6,133,912 A | 10/2000 | Montero |
| 6,259,701 B1 | 7/2001 | Shur |
| 6,728,965 B1 | 4/2004 | Mao |
| 6,826,612 B1 | 11/2004 | Bosloy |
| 6,950,432 B2 | 9/2005 | Chen |
| 7,080,397 B2 | 7/2006 | Cochran |
| 2003/0204856 A1 | 10/2003 | Buxton |
| 2004/0143850 A1 | 7/2004 | Costa |
| 2005/0081244 A1 | 4/2005 | Barrett |
| 2005/0089036 A1 | 4/2005 | Lee |
| 2005/0155075 A1 | 7/2005 | Crichton |
| 2005/0286520 A1 | 12/2005 | Oz |
| 2007/0067793 A1 | 3/2007 | Ng |
| 2007/0171928 A1 | 7/2007 | Kim |

FOREIGN PATENT DOCUMENTS

EP 1523171 4/2005
WO WO/00/60861 10/2000

*Primary Examiner* — Chris Parry
*Assistant Examiner* — Oschta Montoya
(74) *Attorney, Agent, or Firm* — Guntin & Gust, PLC; Andrew Gust

(57) ABSTRACT

Techniques for delivering video on demand channel content via streaming from a first edge aggregation device are provided. A processor is provided that is coupled to a memory. The processor can be operable to receive a request from a requesting device for video on demand channel content, search an index to locate the video on demand channel content, identify a location of the requesting device with respect to a first edge aggregation device and instruct the first edge aggregation device to forward the video on demand channel content to the location of the requesting device. Other embodiments are described.

14 Claims, 9 Drawing Sheets

PASSIVE VIDEO CACHING FOR EDGE AGGREGATION DEVICES

CROSS-REFERENCE TO RELATED APPLICATIONS

This application is a continuation of and claims priority from U.S. patent application Ser. No. 11/444,554 filed May 31, 2006 which is incorporated herein by reference in its entirety.

FIELD OF THE DISCLOSURE

This application relates generally to transporting video over an internet provider to customers.

BACKGROUND OF THE DISCLOSURE

Currently, internet protocol television (IPTV) is delivered via a multicast architecture to the end customer. While this is one manner for delivering content to multiple parties, there are some limitations. One limitation with multicast to deliver IPTV video is "channel change" time. Specifically, the amount of time from when a user desires to switch the viewed television channel to when the user sees the content. In traditional IPTV networks, this is accomplished by sending an internet group management protocol (IGMP) join request upstream from the customer to the network. This IGMP join request would be processed and the multicast group joined and then forwarded to the customer. This process does take some amount of time, varying from about one to about three seconds. An alternative was developed in some emerging IPTV platforms to work around this issue. These new IPTV systems introduce a "fast channel change" capability to allow the user to have the video stream sent via unicast to the customer. While this does improve the channel change time, it increases bandwidth demand. Some IPTV systems may transmit this unicast stream for a set period of time to ensure the multicast stream was joined. During this period, which could vary from 15-30 seconds depending on the implementation, unicast streams are being sent to the customer. In a residential area, the constant changing of channels can produce a large number of temporary unicast streams. The event of having multiple customers request the same channel for a short period of time can have a bandwidth impact on the network capacity needs.

BRIEF DESCRIPTION OF THE DRAWINGS

The disclosure is illustrated by way of example and not limitation in the figures of the accompanying drawings, in which like references may indicate similar elements and in which.

DETAILED DESCRIPTION OF THE DRAWINGS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
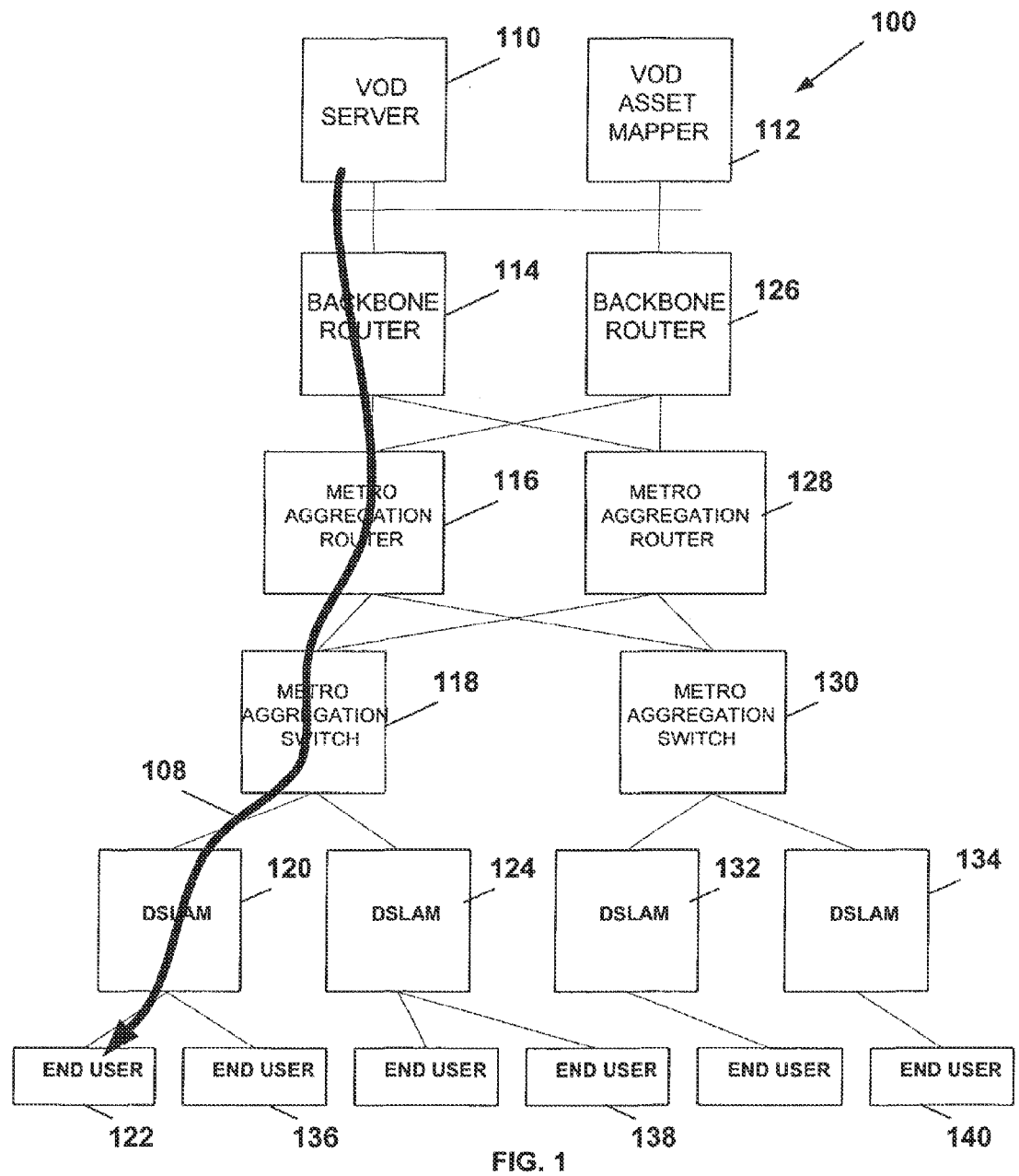
FIG. 1 is a diagram of a network for distributing video on demand (VOD) channel content, according to an example embodiment of the disclosure.

FIG. 1 is a diagram of a network 100 for distributing video on demand (VOD) channel content, according to an example embodiment of the disclosure. In an embodiment, the network 100 (hereinafter VOD distribution service) is implemented in a machine-accessible and readable medium. In an embodiment, the VOD distribution service 100 is wired, wireless, or a combination of wired and wireless.

In an embodiment, the VOD distribution service 100 is implemented with a VOD server 110 and a VOD asset mapper 112 such as for a cable or satellite television provider or as a server for a content provider, such as Home Box Office (HBO), Showtime, and the like. The VOD distribution service 100 interacts with viewers via remote control devices of the end users, when the end users select VOD channel content for consumption on their set-top boxes (STBs) or the like and subsequent viewing on their televisions. Some aspects or features of the VOD distribution service 100 do not directly interact with the end users; rather other services on the end users' STBs interact with the VOD distribution service 100 and with other end user STBs in the background, which is transparent to the end users. These interactions are described more completely herein and below as processing associated with the VOD distribution service 100.

In an embodiment, VOD channel content is pushed along a path (represented as a directional arrow 108) from the VOD server 110 to a first backbone router 114, through a first metro aggregation router 116, further through a first metro aggregation switch 118, and to a first edge aggregation device 120. An end user 122 is receiving a given VOD channel content that has followed the delineated path 108 beginning at the VOD server 110 and being pushed to, e.g., a STB at the end user 122.

Other components of the VOD distribution service 100 include a second edge aggregation device 124 below the first metro aggregation switch 118. By "below" it is meant in the streaming direction away from the VOD server 110, and the item that is "below" is between it and the VOD server 110. Hence, the second edge aggregation device 124 is "below"

the first metro aggregation switch 118 because the first metro aggregation switch 118 is between the VOD server 110 and the second edge aggregation device 124. The first edge aggregation device 120 and the second edge aggregation device 124 can each be devices such as a digital subscriber line access multiplexer (DSLAM). Other components may include a second backbone router 126. Other components include a second metro aggregation router 128, a second metro aggregation switch 130, and a third edge aggregation device 132 and a fourth edge aggregation device 134. Below the first edge aggregation device 120 are located the end users 122 and 136. Below the second edge aggregation device 124 is located the end user 138. And below the fourth edge aggregation device 134 is located the end user 140.

With this context, the processing of the VOD distribution service 100 is now discussed with reference to the FIG. 1 according to an embodiment. In an embodiment, the VOD channel content begins at the VOD server 110 and is being pushed to, e.g., a STB at the end user 122. The VOD channel content is pushed through the first edge aggregation device 120, and the VOD distribution service 100 identifies a geographical location associated with the end user 122. According to an embodiment, at 120, the geographical location is determined in response to an Internet Protocol (IP) address of the end user 122.

In an embodiment, the VOD distribution service 100 receives a request for VOD channel content from a requestor. As used herein "requestor" can mean a location from which a request is received. In an embodiment, the requestor is the end user at 136. That is, a requestor 136 (end user 136) uses a remote control device or other input device to communicate over the network with the VOD distribution service 100 that a specific piece of VOD channel content is desired by the requestor 136.

The geographical location of the requestor 136 permits the VOD distribution service 100 to intelligently determine how the specific VOD channel content is delivered to the requestor 136, particularly through the first edge aggregation device 120. An index is maintained, in an embodiment at the VOD asset mapper 112 to determine the locations of a viewer that is receiving the given VOD channel content; in this embodiment, the end user 122. After the index is generated, it is regularly updated in a dynamic and real time fashion. Updates reflect when a new end user is added, deleted, or geographically moved. Frequent updates occur to associated VOD channel content as being available on specific STBs as the VOD channel content is distributed to the viewers.

The VOD channel content delivery service 100 manages the index to supply identities of STBs to requestors of specific VOD channel content. The identity may be an IP address that a requestor can use to establish a connection with a particular edge aggregation device for purposes of acquiring desired VOD channel content. According to an embodiment, the identities of the end users may be resolved by comparing the geographical locations of end users associated with that of a requestor, to the geographical profile information associated with the end users in the index. This may be done using thresholds to resolve an optimal proximity between a requestor and available end users that have the requested VOD channel content.

The VOD distribution service 100 uses a request for VOD channel content and a geographical location of the requestor 136 to search the index and find matches of one or more other end users that can service or push the desired VOD channel content to the requestor 136, which originates at the first edge aggregation device 120.

In the illustrated embodiment, because the requestor 136 is located below the same first edge aggregation device 120 as the end user 122, which is receiving the VOD channel content requested, the first edge aggregation device 120 is instructed to push the VOD channel content to the requestor 136 via multiplexing, without a unicast stream of the requested VOD channel content originating at the VOD server 110.

Figure 2:
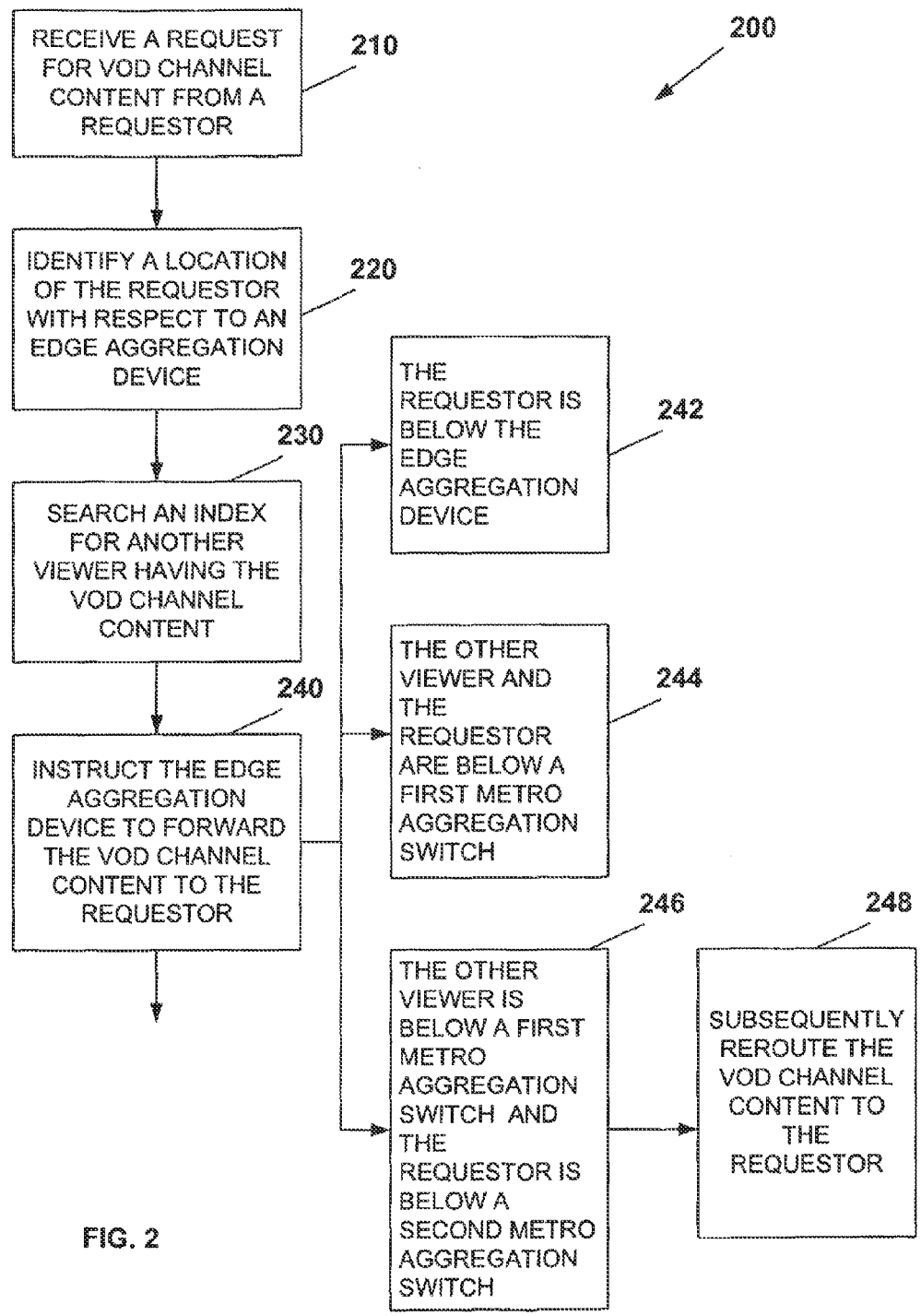
FIG. 2 is a diagram of a method for distributing VOD channel content according to an example embodiment of the disclosure.

FIG. 2 is a diagram of a method 200 for distributing VOD channel content according to an example embodiment of the disclosure. The method 200 (herein after VOD distribution service) is implemented in a machine-accessible and readable medium and is accessible over a network such as the VOD distribution service 100 depicted in FIG. 1. The network may be wired, wireless, or a combination thereof At 210, the VOD distribution service 200 receives a request for VOD channel content from a requestor. By way of non-limiting example, a requestor 136, depicted in FIG. 1 is the requestor.

At 220, the VOD distribution service 200 identifies a location of the requestor with respect to an edge aggregation device. By way of non-limiting example, the requestor 136 in FIG. 1 is noted as being below the first edge aggregation device 120.

At 230, the VOD distribution service 200 searches an index for other viewers that are already receiving the VOD channel content. In an embodiment, the VOD distribution service 200 searches an index for other viewers that are already receiving the VOD channel content and that are in relative proximity to the geographical location of the requestor. By way of non-limiting example, the index is contained within the VOD asset mapper 112 depicted in FIG. 1. The proximity consideration may be based on a threshold value. For example, a specific viewer that is already receiving the requested VOD channel content may be considered in proximity to the requestor. The proximity can be determined by rules such as if the geographical location of the requestor is within a specific distance of the end user who is receiving the receiving the requested VOD channel content, within a specific region of the end user, within the same state, within the same country, or within the same subnetwork, etc. Thus proximity is resolved based on configured or desired threshold values.

At 240, the VOD distribution service 200 instructs the edge aggregation device to forward the VOD channel content to the requestor. The requested VOD channel content maybe acquired from one or more of the other edge aggregation devices that conform to the search criteria used by the VOD distribution service 200 when searching the index. Consequently, the von distribution service 200 does not have to identify a single edge aggregation device that can service the request for the von channel content. The von distribution service 200 may therefore produce a queue of edge aggregation devices that can service the request.

Figure 3:
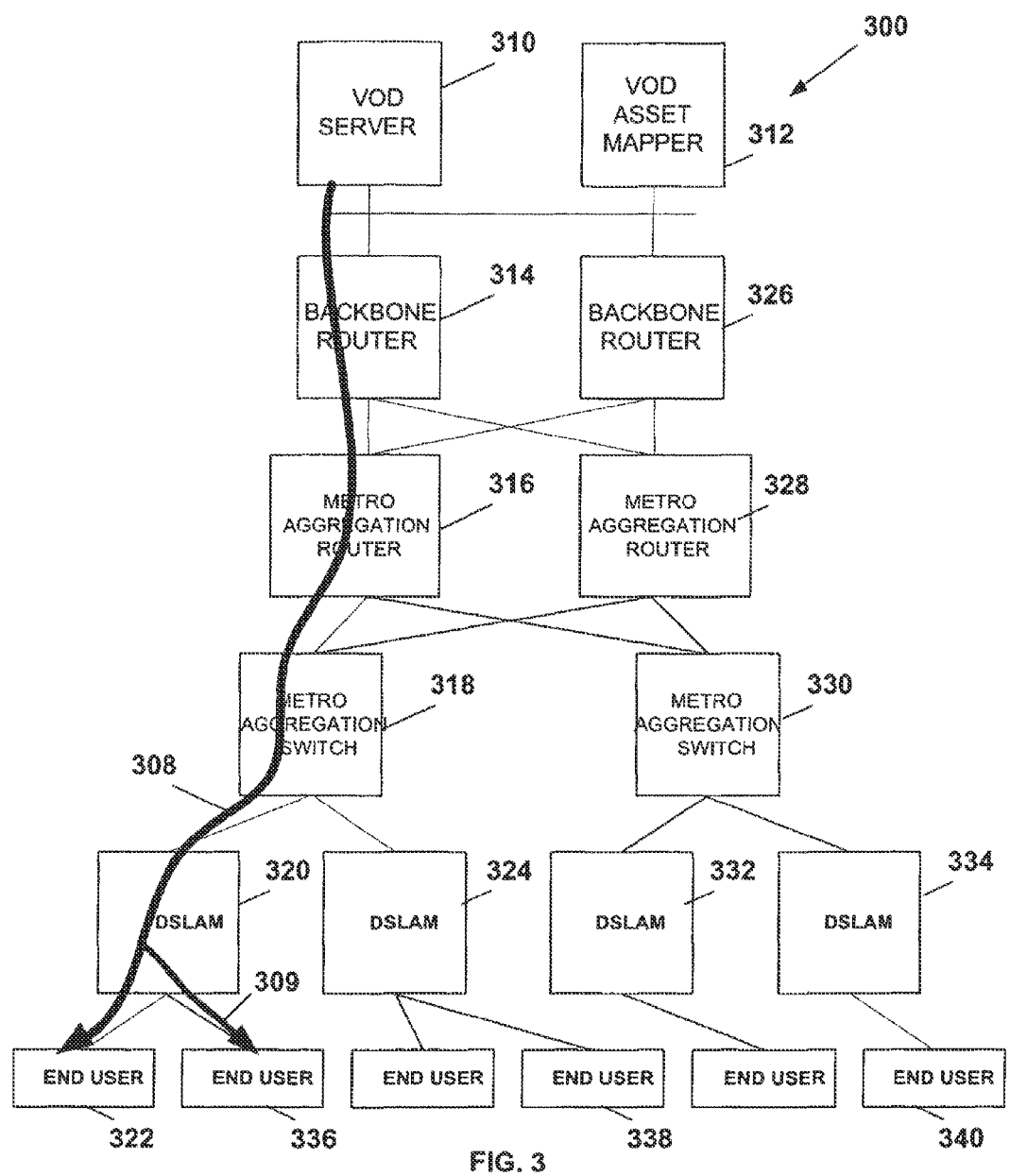
FIG. 3 is a diagram of a VOD distribution service for distributing VOD channel content, according to an example embodiment of the disclosure.

At 242, the situation arises that the requestor is below the same edge aggregation device as the end user that is already receiving the von channel content. In this embodiment, the index is used to direct the edge aggregation device to push the von channel content not only to the existing end user but also to the requestor. In an embodiment, the index is stored, either as a general index at a von asset mapper, as a local index at the edge aggregation device, or as a general index at the edge aggregation device. An illustration of this embodiment is depicted in FIG. 3, which will be discussed further.

Figure 4:
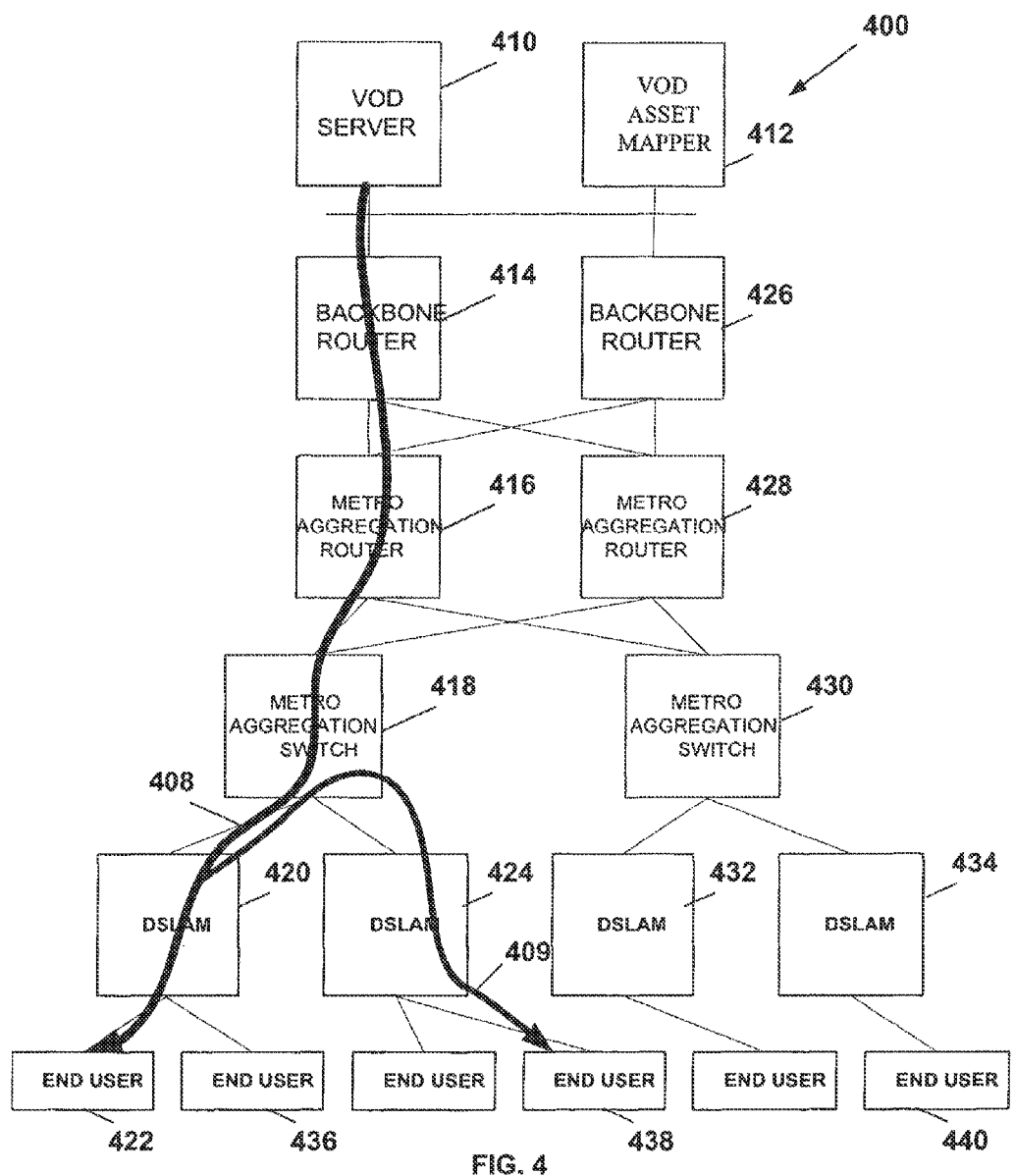
FIG. 4 is a diagram of a network for distributing VOD channel content, according to an example embodiment of the disclosure.

At 244, the situation arises that the requestor is below the same metro aggregation switch as the end user that is already receiving the von channel content. In this embodiment, the index is used to direct the first edge aggregation device above the existing end user, to push the von channel up to the same metro aggregation switch and then down to a second edge aggregation device that is above the requestor. In an embodiment, the index is stored, either as a general index at a von asset mapper, as a local index at the first edge aggregation device, at the metro aggregation switch, or as a general index at one of the edge aggregation device and the metro aggregation switch. An illustration of this embodiment is depicted in FIG. 4, which will be discussed further.

Figure 5:
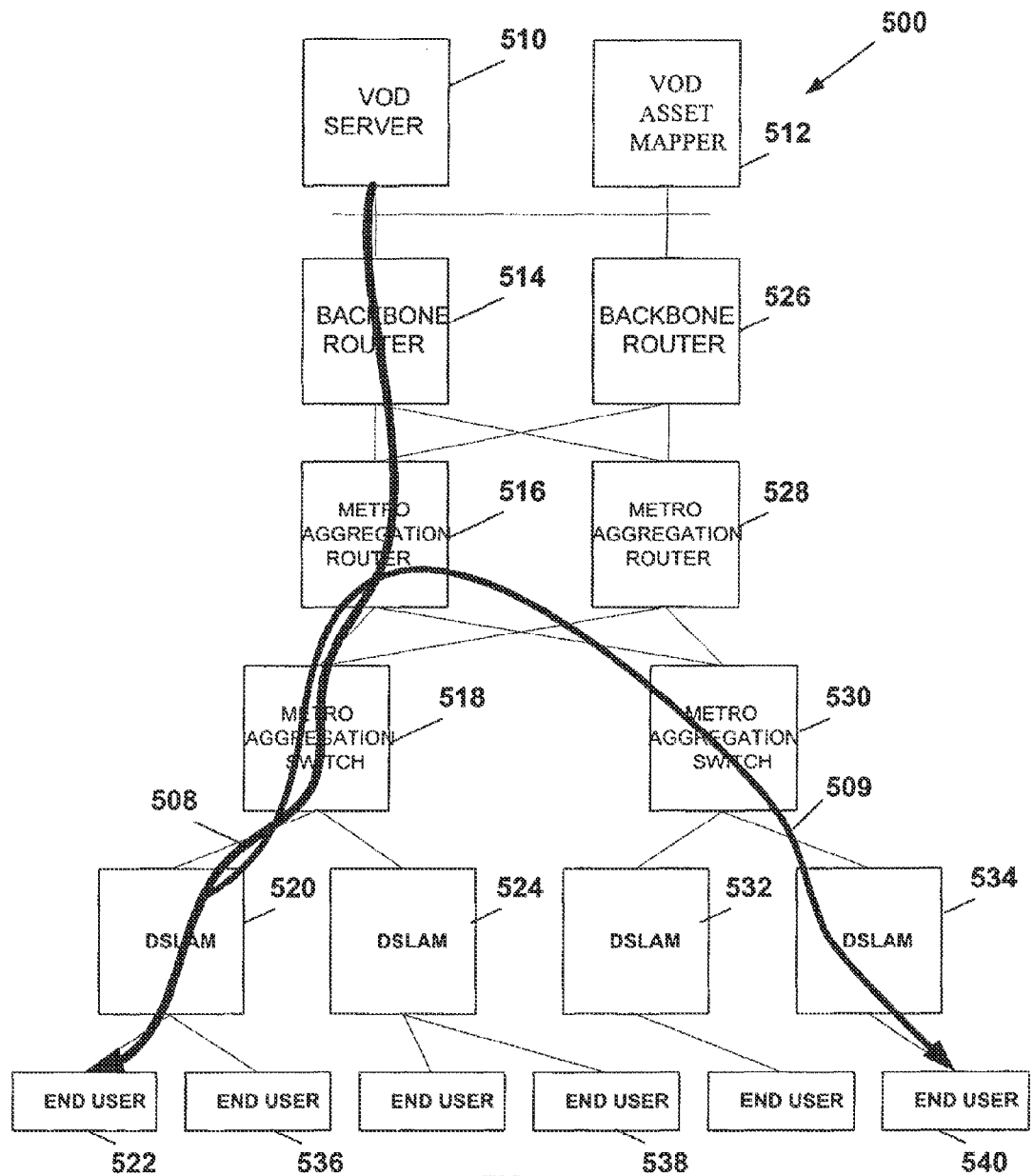
FIG. 5 is a diagram of a network for distributing VOD channel content, according to an example embodiment of the disclosure.

At 246, the situation arises that the requestor is below a different metro aggregation switch as the end user that is already receiving the von channel content. In this embodiment, the index is used to direct the first edge aggregation device above the existing end user, to push the von channel content up to the metro aggregation switch that is streaming the von channel content to the existing end user, and then down through a second metro aggregation switch and through the edge aggregation device that is above the requestor. In an embodiment, the index is stored, either as a general index at a von asset mapper, as a local index at the first edge aggregation device, at the metro aggregation switch, or as a general index at one of the first edge aggregation device and the first metro aggregation switch. An illustration of this embodiment is depicted in FIG. 5, which will be discussed further.

At 248, the situation arises that after the situation at 246 has been dealt with according to an embodiment, the VOD asset mapper makes a decision to form a new unicast stream of the requested VOD channel content to the requestor, or to join another multicast stream that is closer or more efficient. This situation can arise for various reasons, such as the number of nodes between the VOD server and the requestor may be equivalent or shorter in length, time, or efficiency and the like.

FIG. 3 is a diagram of a network 300 (hereinafter VOD distribution service 300) for distributing VOD channel content, according to an example embodiment of the disclosure. In this embodiment, the situation arises that the requestor is below the same edge aggregation device as the end user that is already receiving the VOD channel content. The VOD distribution service 300 implements the request scenario depicted in FIG. 2 at 242. In an embodiment, the VOD distribution service 300 is wired, wireless, or a combination of wired and wireless. In an embodiment, the VOD distribution service 300 is implemented with a VOD server 310 and a VOD asset mapper 312. In an embodiment, VOD channel content is pushed (represented as a directional arrow 308) from the VOD server 310 to a first backbone router 314, through a first metro aggregation router 316, further through a first metro aggregation switch 318, and to a first edge aggregation device 320. An end user 322 is viewing a given VOD channel content that has followed the delineated path beginning at the VOD server 310 and being pushed to, e.g., a STB at the end user 322.

Other components of the VOD distribution service 300 include a second edge aggregation device 324 below the first metro aggregation switch 318. The first edge aggregation device 320 and the second edge aggregation device 324 can each be devices such as a DSLAM. Other components may include a second backbone router 326. Other components may include a second metro aggregation router 328, a second metro aggregation switch 330, and a third edge aggregation device 332 and ,a fourth edge aggregation device 334. The requestor 336 is also located below the first edge aggregation device 320. Below the second edge aggregation device 324 is located the end user 338. And below the fourth edge aggregation device 334 is located the end user 340.

In an embodiment, the VOD distribution service 300 receives a request for VOD channel content from the requestor 336. The geographical location of the requestor 336 permits the VOD distribution service 300 to intelligently determine how the specific VOD channel content is delivered to the requestor 336, particularly through the first edge aggregation device 320. An index is maintained, in an embodiment at the VOD asset mapper 312 to determine the locations of viewers that are receiving the given VOD channel content; in this embodiment, the end user 322. The VOD distribution service 300 uses the request for VOD channel cOJ;ltent and a geographical allocation of the requestor 336 to search the index and find matches of one or more other end users that can service or push the desired VOD channel content to the requestor 336, which originates at the first edge aggregation device 320 in this embodiment. The index includes associations between VOD channel content and the geographical location of at least one end user, e.g. end user 322 that is receiving the VOD channel content.

In the illustrated embodiment, because the requestor 336 is located below the same first edge aggregation device 320 as the end user 322, which is receiving the VOD channel content requested, the first edge aggregation device 320 is instructed to push the VOD channel content to the requestor 336 via multiplexing, without a dedicated unicast stream of the requested VOD channel content originating at the VOD server 310. The directional arrow 309 illustrates this end result.

FIG. 4 is a diagram of a network 400 (hereinafter VOD distribution service 400) for distributing VOD channel content, according to an example embodiment of the disclosure. In this embodiment, the situation arises that the requestor is below a different edge aggregation device as the end user that is already receiving the VOD channel content. In an embodiment, the VOD distribution service 400 is wired, wireless, or a combination of wired and wireless.

In an embodiment, the VOD distribution service 400 is implemented with a VOD server 410 and a VOD asset mapper 412. In an embodiment, VOD channel content is pushed (represented as a directional arrow 408) from the VOD server 410 to a first backbone router 414, through a first metro aggregation router 416, further through a. first metro aggregation switch 418, and to a first edge aggregation device 420. An end user 422 is viewing a VOD channel content that has followed the delineated path beginning at the VOD server 410 and being pushed to, e.g., a STB at the end user 422.

Other components of the VOD distribution service 400 include a second edge aggregation device 424 below the first metro aggregation switch 418. The first edge aggregation device 420 and the second edge aggregation device 424 can each be devices such as a DSLAM. Other components may include a second backbone router 426. Other components may include a second metro aggregation router 428, a second metro aggregation switch 430, and a third edge aggregation device 432 and a fourth edge aggregation device 434. Below the first edge aggregation device 420 is located a second end user 436. The requestor 438 is located below the second edge aggregation device 424. And below the fourth edge aggregation device 434 is located an end user 440.

In this embodiment, the index is used to direct the first edge aggregation device 420 above the existing end user 422, to push the VOD channel content up to the first metro aggregation switch 418 that is streaming the VOD channel content to the existing end user 422, and then down through a second edge aggregation device 424 that is above the requestor 438. In an embodiment, the index is stored, either as a general index at a VOD asset mapper, as a local index at the first edge aggregation device, at the metro aggregation switch, or as a general index at one of the first edge aggregation device and the first metro aggregation switch. The VOD distribution service 400 implements the request scenario depicted in FIG. 2 at 244. In an embodiment, the VOD distribution service 400 receives a request for VOD channel content from the requestor 438. The geographical location of the requestor 438 permits the VOD distribution service 400 to intelligently determine how the specific VOD channel content is delivered to the requestor 438, particularly through the second edge aggregation device 420. An index is maintained, in an embodiment at the VOD asset mapper 412 to determine the locations of viewers that are receiving the given VOD channel content; in this embodiment, the end user 422. The VOD distribution service 400 uses the request for VOD channel content and a geographical location of the requestor 438 to search the index and find matches of one or more other end users that can service or push the desired VOD channel content to the requestor 438, which originates at the first edge aggregation device 420. The index includes associations between VOD channel content and geographical location of at least one end user, e.g. end user 422 that has the VOD channel content.

In the illustrated embodiment, because the requestor 438 is located below the second edge aggregation device 424, the first edge aggregation device 420 is instructed to push the VOD channel content to the requestor 438, upward to the first metro aggregation switch 418 and down through the second edge aggregation device to the requestor 438, without a dedicated unicast stream of the requested VOD channel content originating at the VOD server 410. The directional arrow 409 illustrates this end result.

FIG. 5 is a diagram of a network 500 (hereinafter VOD distribution service 500) for distributing VOD channel content, according to an example embodiment of the disclosure. In this embodiment, the situation arises that the requestor is below a different metro aggregation switch as the end user that is already receiving the VOD channel content. In an embodiment, the VOD distribution service 500 is wired, wireless, or a combination of wired and wireless.

In an embodiment, the VOD distribution service 500 is implemented with a VOD server 510 and a VOD asset mapper 512. In an embodiment, VOD channel content is pushed (represented as a directional arrow 508) from the VOD server 510 to a first backbone router 514, through a first metro aggregation router 516, further through a first metro aggregation switch 518, and to a first edge aggregation device 520. An end user 522 is viewing a VOD channel content that has followed the delineated path 508 beginning at the VOD server 510 and being pushed to, e.g., a STB at the end user 522;

Other components of the VOD distribution service 500 include a second edge aggregation device 524 below the first metro aggregation switch 518. The first edge aggregation device 520 and the second edge aggregation device 524 can each be devices such as a DSLAM. Other components may include a second backbone router 526. Other components may include a second metro aggregation router 528, a second metro aggregation switch 530, and a third edge aggregation device 532 and a fourth edge aggregation device 534. Below the first edge aggregation device 520 is located a second end user 536. Below the second edge aggregation device 524 is located an end user 538. The requestor 540 is located below the fourth edge aggregation device 534.

In this embodiment, the index is used to direct the first edge aggregation device above the existing end user, to push the VOD channel content up to the first metro aggregation router that is streaming the VOD channel content to the existing end user, and then down through second metro aggregation switch and further to a fourth edge aggregation device that is above the requestor. In an embodiment, the index is stored, either as a general index at a VOD asset mapper, as a local index at the first edge aggregation device, at the first metro aggregation switch, at the first metro aggregation router, or as a general index at one of the first edge aggregation device, the first metro aggregation switch, or the first metro aggregation router. The VOD distribution service 500 implements the request scenario depicted in FIG. 2 at 246.

In an embodiment, the VOD distribution service 500 receives a request for VOD channel content from the requestor 540. The geographical location of the requestor 540 permits the VOD distribution service 500 to intelligently determine how the specific VOD channel content is delivered to the requestor 540, particularly through the fourth edge aggregation device 534. An index is maintained, in an embodiment at the VOD asset mapper 512 to determine the locations of viewers that are receiving the given VOD channel content; in this embodiment, the end user 522. The VOD distribution service 500 uses the request for VOD channel content and a geographical location of the requestor 540 to search the index and find matches of one or more other end users that can service or push the desired VOD channel content to the requestor 540, which originates at the first edge aggregation device 520. The index includes associations between VOD channel content and geographical location of at least one end user, e.g. end user 522 that has the VOD channel content.

In the illustrated embodiment, because the requestor 540 is located below the fourth edge aggregation device 534, the first edge aggregation device 520 is instructed to push the VOD channel content to the requestor 540, upward to the first metro aggregation router 516, and down through the fourth edge aggregation device to the requestor 540, without a dedicated unicast stream of the requested VOD channel content originating at the VOD server 510. The directional arrow 509 illustrates this end result.

Figure 6:
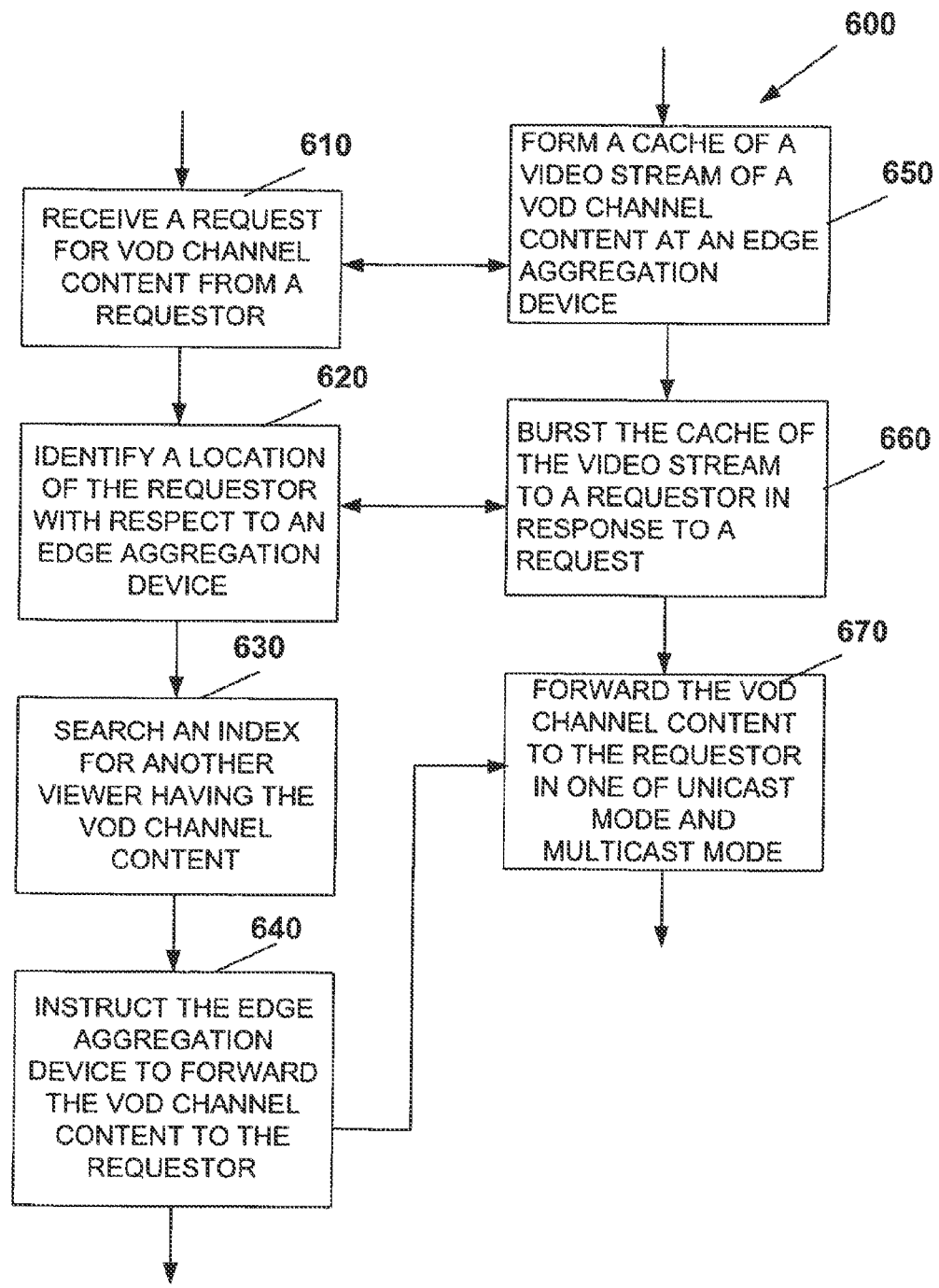
FIG. 6 is a diagram of a method for distributing VOD channel content according to an example embodiment of the disclosure.

FIG. 6 is a diagram of a method 600 for distributing VOD channel content according to an example embodiment of the disclosure. The method 600 (herein after VOD distribution service) is implemented in a machine-accessible and readable medium and is accessible over a network such as the network 100 depicted in any of FIG. 1, FIG. 3, FIG. 4, and FIG. 5 according to an embodiment. The network may be wired, wireless, or a combination thereof.

At 650, the method includes forming a cache of a video stream of VOD channel content at an edge aggregation device. By way of non-limiting example, the first edge aggregation device 120 in FIG. 1 includes a buffer for forming a cache of the VOD channel content for the end user 122.

At 660, the cache of the video stream is burst to a requestor. In an embodiment, the requestor, although not currently viewing the requested VOD channel content, has a history or a calculated likelihood of requesting the VOD channel content. Accordingly, the cache of the video stream can be buffered at the first edge aggregation device if the requestor is below it, or at an edge aggregation device that is remote to the requestor, but where the requested VOD channel content is being streamed. In other words, the video stream can be burst to a buffer such as an STB of the anticipated requestor, before the request is made, if any.

At 610, the VOD distribution service 600 receives a request for VOD channel content from a requestor. By way of non-limiting example, a requestor 136, depicted in FIG. 1 is the requestor.

At 620, the VOD distribution service 600 identifies a location of the requestor with respect to an edge aggregation device. By way of non-limiting example, the requestor 136 in FIG. 1 is noted as being below the first edge aggregation device 120.

At 630, the VOD distribution service 600 searches an index for other viewers that are already receiving the VOD channel content. In an embodiment, the VOD distribution service 600 searches an index for other viewers that are already receiving the VOD channel content and that are in relative proximity to the geographical location of the requestor. By way of non-limiting example, the index is the VOD asset mapper 112 depicted in FIG. 1.

At 640, the VOD distribution service 600 instructs the edge aggregation device to forward the VOD channel content to the requestor. The requested VOD channel content may be acquired from one or more of the other edge aggregation devices that conform to the search criteria used by the VOD distribution service 200 when searching the index. Consequently, the VOD distribution service 200 does not have to identify a single edge aggregation device that can service the request for the VOD channel content. The VOD distribution service may therefore produce a queue of edge aggregation devices that can service the request.

At 670, uncached VOD channel content is forwarded to the requestor in one of unicast mode and multicast mode. In this embodiment, the VOD channel content is received after the burst mode, for anyone of the embodiments set forth in this disclosure.

Figure 7:
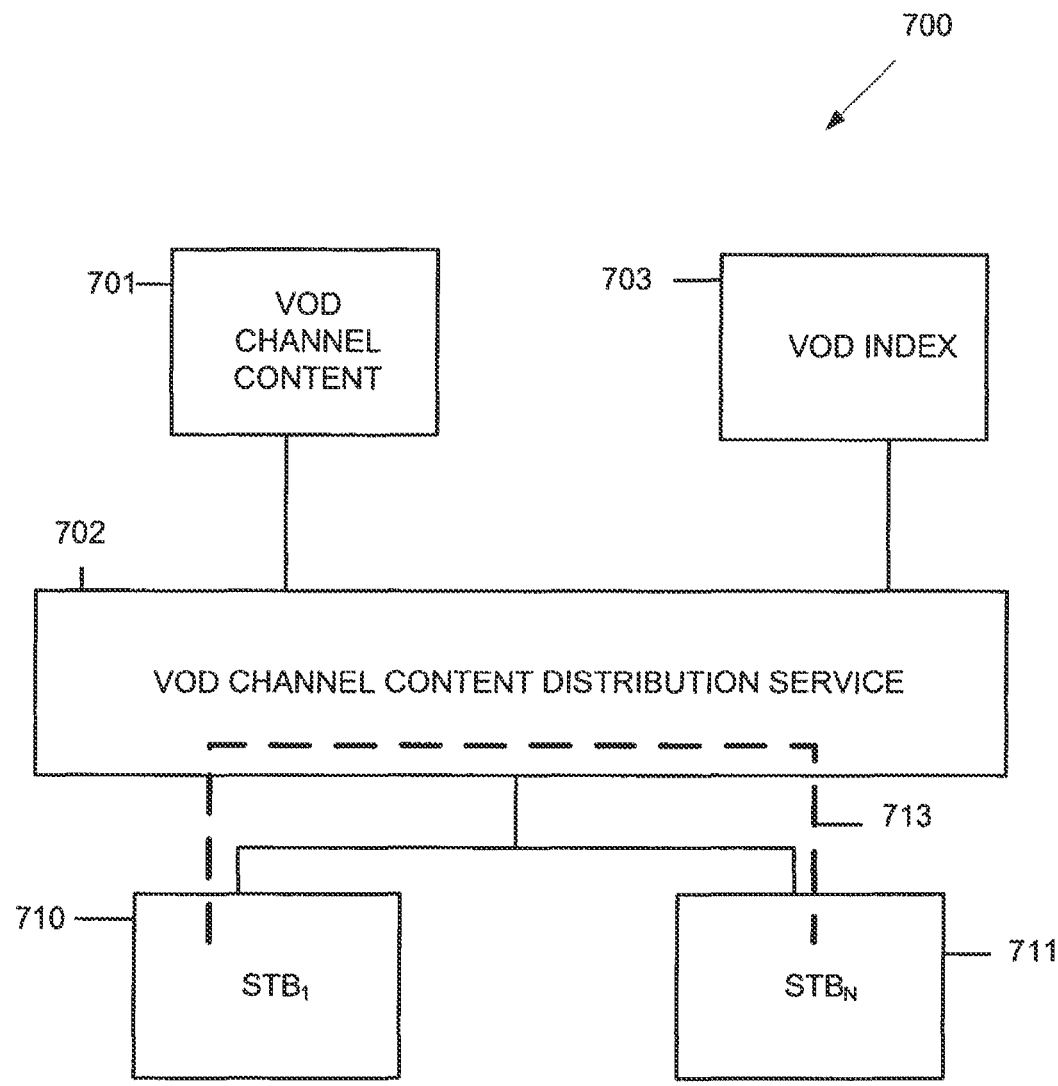
FIG. 7 is diagram of a VOD distribution system, according to an example embodiment of the disclosure.

FIG. 7 is diagram of a VOD distribution system 700, according to an example embodiment of the disclosure. The VOD distribution system 700 is implemented within a machine-accessible medium. The VOD distribution system 700 implements, among other things, the respective methods 200 and 600 of the FIGS. 2 and 6.

The VOD distribution system 700 includes VOD channel content 701 and a VOD content distribution service 702. The VOD distribution system 700 may also include a VOD index 703. The VOD channel content 701 resides in memory and within a repository that may include a variety of other VOD channel content 701. The memory may be volatile or non volatile and it may also be fixed or removable storage. Furthermore, the VOD channel content distribution service 702 may be referred to as a VOD content distribution service element, such as a server, proxy, gateway, etc. Each of the components of the VOD distribution system 700 and the relationships of the components to end users, e.g. of the end user STBs will now be discussed in detail.

The VOD channel content 701 may include material related to televisions shows, documentaries, movies, sporting events, news events, and others. The VOD channel content 701 is housed within storage devices or on removable media and subsequently interfaced to a device that makes it available on the network. Viewers request the VOD channel content 701 from their local environments using their STBs or the like to contact the VOD content distribution service 702.

The VOD content distribution service 702 initially distributes or injects the VOD channel content 701 into the network by placing it or delivering it to one or more first or initial STBs 710. Example processing associated with the VOD content distribution service 702 was provided above with the discussion of the respective methods 200 and 600 of the FIGS. 2 and 6.

The VOD content distribution service 702 may provide a buffered amount of the VOD channel content 701 with the initial end user's STB. Alternatively, the VOD content distribution service 702 may inject the VOD channel content 701 after viewer associated with the initial STB 710 make a specific request for the VOD channel content 701.

The VOD channel content distribution service 702 also manages identities associated with the STBs 710 and 711 and the viewers associated with those STBs 710 and 711. The VOD channel content distribution service 702 also keeps track of which STBs 710 or 711 have which VOD content 701 at any particular point in time.

According to an embodiment, the association and information associated with the STBs 710 and 711 and the VOD channel content 701 is maintained in a VOD index 703. The VOD channel content distribution service 702 generates and manages the VOD index 703. The VOD index 703 is regularly updated with new associations, modified associations, and/or deleted associations. The associations may also include geographical profile information for the STBs 710 and 711, which identify a present or current geographical location for each of the STBs 710 and 711.

The VOD channel content distribution service 702 also processes requests from viewers (requestors) for specific VOD channel content 701 after that specific VOD channel content 701 has been injected into the network and is present on a number of the STBs 710.

When a request for VOD channel content 701 is received, the VOD channel content distribution service 702 determines one or more specific viewers or STBs 710 that can service the request by delivering the VOD channel content 701 to the requesting viewers or STBs 711 with a connection that pushes the VOD channel content from an existing viewer's edge aggregation device to the requestor. Essentially, the VOD channel content distribution service 702 is a manager of where and how requestors may best or optimally acquire desired VOD channel content 701. One technique for doing this is to perform a geographic proximity search on the STBs 710 that have the requested VOD channel content 701 when a requestor through their STB 711 at a given or known geographical location dynamically or in real time requests the VOD channel content 701 from the VOD channel content distribution service 702.

The VOD channel content 701 is then delivered to a requestor through their STB 711 from an existing user's edge aggregation device, part of the VOD channel content distribution service 702 via a connection 713 that does not originate at the source of the VOD channel content 701.

According to an embodiment, the VOD content distribution service 702 may also initially populate initial STBs 710 with the VOD channel content 701 in an encrypted format. The encrypted format is decrypted and playable with a license or access key. The key may be delivered to the requestor at the STB 711 from the VOD channel content distribution service 702 when the specific VOD channel content 701 is requested.

Figure 8:
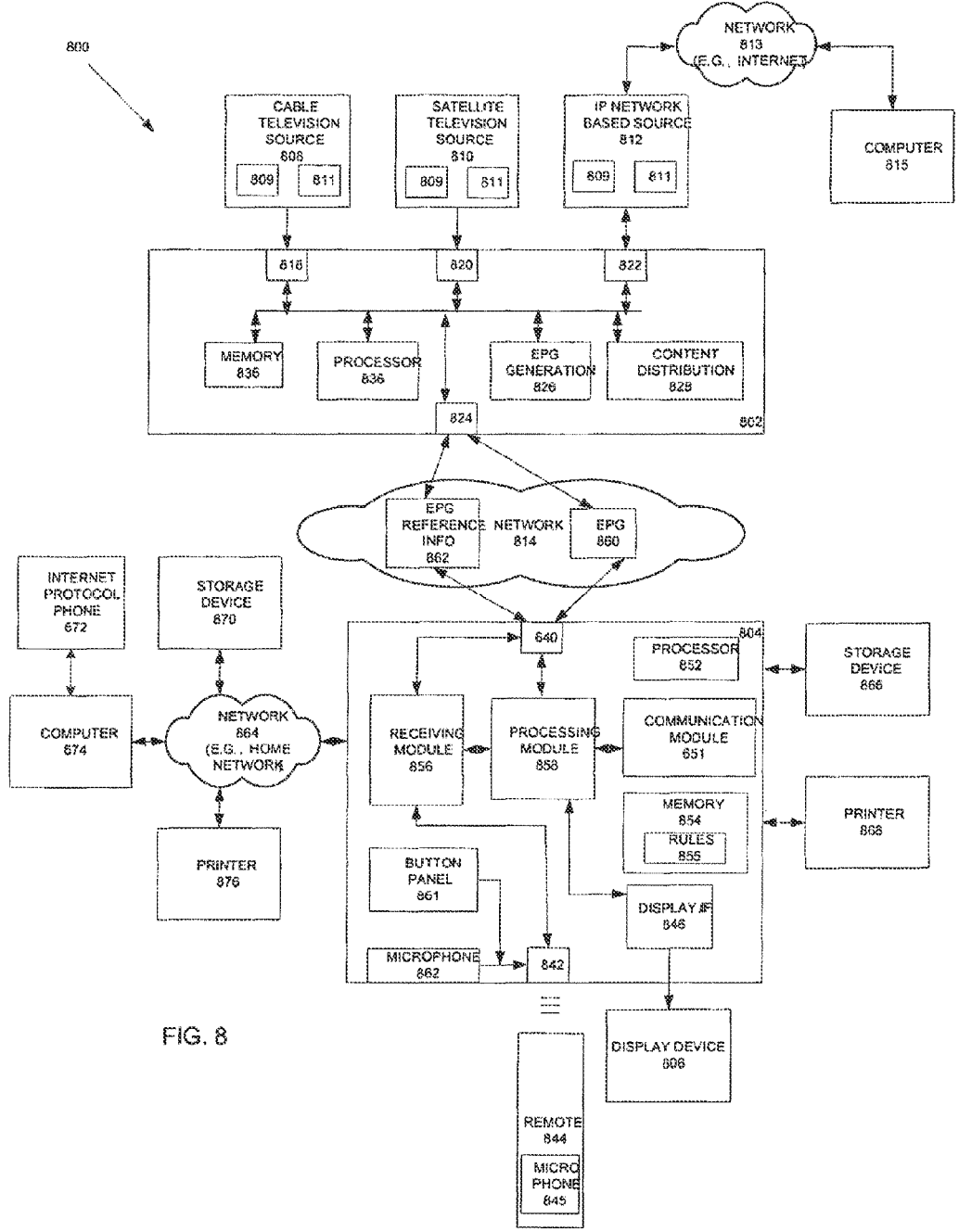
FIG. 8 is a diagram of an example network architecture for devices, machines, services, systems, and instructions to interact and perform anyone or more of the edge aggregation device VOD channel content forwarding methods discussed herein, according to an example embodiment of the disclosure.
Figure 9:
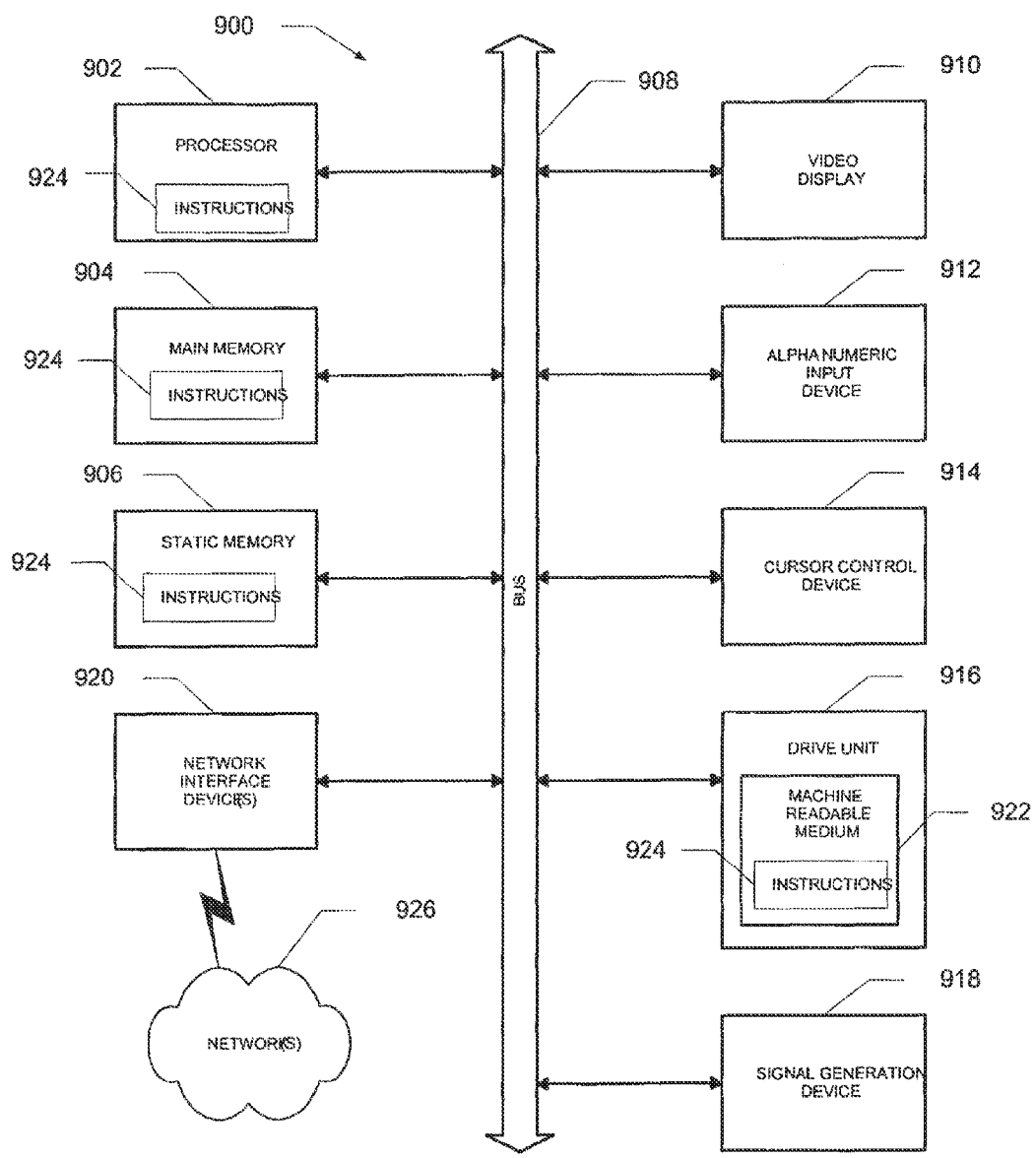
FIG. 9 is a diagram of an example machine architecture within which a set of instructions for causing the machine to perform anyone or more of the edge aggregation device VOD channel content delivery methods discussed herein may be executed, according to an example embodiment of the disclosure.

FIGS. 8-9 are now presented for purposes of providing an example network architecture and machine architecture for which devices can interact to achieve the teachings and techniques presented herein. This layout and configuration is presented for purposes of illustration only and is not intended to limit the embodiments presented herein.

FIG. 8 is a diagram of an example network architecture 800 for devices, machines, services, systems, and instructions to interact and perform any one or more of the edge aggregation device VOD channel content forwarding methods discussed herein, according to an example embodiment of the disclosure.

FIG. 8 may also be viewed as an example multimedia distribution system 800 that is implemented in accordance with at least one edge aggregation device VOD channel content forwarding embodiment of the present disclosure. As shown, the system 800 includes a multimedia content provider 802, a set-top box 804, a display device 806, a plurality of multimedia content sources, such as cable television source 808, satellite television source 810, and IP network-based source 812.

In the illustrated embodiment, the edge aggregation device VOD channel content forwarding provider 802 and the set-top box 804 are connected via a network 814, where the network 814 can include a cable television distribution network, a satellite distribution network, a broadcast television distribution network, a data packet-based computer network (e.g., an Ethernet network), and the like. Likewise, the edge aggregation device VOD channel content sources 808, 810, and 812 may be connected via one or more networks to the content provider 802.

As shown, the edge aggregation device VOD channel content provider 802 can include one or more interfaces 818, 820, and 822 to interface with the edge aggregation device von channel content sources 808, 810, and 812, respectively, and an interface 824 to interface with the set-top box 804 via the network 814. The interfaces 818, 820, 822, and 824 may include any of a variety of interfaces, such as a coaxial cable interface, a wireless interface for receiving satellite or broadcast transmissions, or a data packet network interface, such as an Ethernet interface or a router. The IP Network based source 812 is shown to be connected to a computer 815 over a network 813, e.g., Internet thereby providing a communication path between a user operating the set-top box 804 and a user operating the computer 815. The edge aggregation device von channel content provider 802 further may include an EPG generation module 826 and a multimedia channel content distribution module 828. The modules 826 and 828 may be implemented as software, hardware, firmware, of combinations thereof To illustrate, the channel content provider 802 may include a memory 836, e.g., static random access memory (SRAM) and one or more processors 838, where the modules 826 and 828 may be implemented in part or in whole as executable instructions stored in the memory 836 and executed by the processor 838 to perform the techniques described herein.

As also shown, the set-top box 804 may include an interface 840 for interfacing with the edge aggregation device von channel content provider 802 via the network 814, a control interface 842 to receive user input and commands, e.g., via a remote control 844, a button panel 861, a microphone 862 and a display interface 846 to interface with the display device 806. The interface 840 may include any of a variety of appropriate interfaces, such as a coaxial cable interface, a wireless interface to send and receive wireless transmissions, or a data packet-based network interface, such as an Ethernet interface. The control interface 842 may include any of a variety of interfaces, such as an infrared interface, a wireless interface, or the button panel 861. The remote control 844 is shown to include a microphone 845 for receiving voice commands and the set-top box 804 is also shown to include a microphone 862 for receiving voice commands.

The set-top box 804 is further shown to be connected to a storage device 866, e.g., hard disk, compact disk, floppy, universal serial bus key, etc. for storing files, a printer 868 for printing files, and a network 864, e.g., home network. The network 864, in one embodiment, may connect the set-top box 804 to a computer 874 that is connected to an internet protocol phone 872, a storage device 870 for storing electronic files, and a printer 876. The set-top box 804 further may include a processing module 858, a receiving module 856, and a communication module 851. The processing module 858, receiving module 856, and communication module 851 may be implemented as hardware, software, firmware, or combinations thereof To illustrate, the set-top box 804 may include a memory 854 and one or more processors 852, where one or both of modules 848 and 850 are implemented as executable instructions stored in memory 854 and executed by the processor 852 to implement techniques described herein. The memory is further shown to include rules 855 that may be utilized to control the use of images that maybe captured from content that is displayed on the display device 806. For example the rules 855 may embodied as a digital rights management license that may be distributed with content from the content source 808, 810, and 812. As is well known in the art, the license may include rules 555 that may restrict the use of the associated content.

In a particular embodiment, the edge aggregation device VOD channel content provider 802 receives data representative of multimedia channels from each of the different channel content sources 808, 810, and 812, and provides data representative of at least a subset of the multimedia channels to the set-top box 804 for processing and display at the display device 806 and/or output via an audio device (not shown). In an embodiment, the edge aggregation device VOD channel content provider includes a channel content module 809 that communicates data that includes channel content and a control module 811 that communicates data that includes control information, e.g., digital license that includes a rule that restricts the use of associated channel content. Moreover, in a particular embodiment, the edge aggregation device VOD channel content provider 802 provides data representative of an electronic programming guide (EPG) 860 to the set-top box 804 for processing by the processing module 858 and for navigation by a user via the control interface 842 and the processing module 858. As described herein, the EPG 860, in one embodiment, represents a unified EPG including listings for the multimedia channels provided by two or more channel content sources that provide multimedia channels to the edge aggregation device VOD channel content provider 802. To illustrate, in a particular embodiment, the EPG 860 represents a navigable program guide or user interface whereby an end user, via the remote control 844 or other input device, can direct the processing module 850 to navigate between multimedia channels by selecting an icon or other graphical representation of the desired channel as represented by a graphical display of the EPG 860. The EPG 860 may combine representations of all of the multimedia channels from different content sources in a single list or different lists for different content sources may be displayed concurrently by the EPG 860. Moreover, multimedia channels may be organized within the EPG 860 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

FIG. 9 is a diagram of an example machine architecture within which a set of instructions for causing the machine to perform anyone or more of the edge aggregation device VOD channel content delivery methods discussed herein may be executed, according to an example embodiment of the disclosure. Accordingly, FIG. 9 shows a diagrammatic representation of machine in the example form of a computer system 900 within which a set of instructions, for causing the machine to perform anyone or more of the methodologies discussed herein, may be executed.

In alternative embodiments, the machine operates as a standalone device or may be connected e.g., networked to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform anyone or more of the methodologies discussed herein.

The example computer system 900 includes a processor 902 e.g., a central processing unit (CPU) a graphics processing unit (GPU) or both, a main memory 904 and a static memory 906, which communicate with each other via a bus 608. The computer system 900 may further include a video display unit 910, e.g., a liquid crystal display (LCD) or a cathode ray tube (CRT). The computer system 900 also includes an alphanumeric input device 912, e.g., a keyboard, a cursor control device 914, e.g., a mouse, a disk drive unit 916, a signal generation device 918, e.g., a speaker and a network interface device 920.

The disk drive unit 916 includes a machine-readable medium 922 on which is stored one or more sets of instructions, e.g., software 624 embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present disclosure. The term "machine-readable medium" shall accordingly be taken to include, but not be limited to, solid-state memories; optical and magnetic media, and carrier wave signals;

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate exemplary embodiment.

What is claimed is:

1. A method comprising:
receiving a request from a requesting device for video on demand channel content;
identifying a location of the requesting device with respect to a first edge aggregation device;
searching an index stored at an asset mapper device to locate the video on demand channel content; and
instructing the first edge aggregation device to forward the video on demand channel content to the location of the requesting device; wherein when the location of the requesting device is downstream of a second edge aggregation device and the first edge aggregation device is downstream of a first metro aggregation router and the second edge aggregation device is downstream of a second metro aggregation router, the method comprises instructing the first edge aggregation device to forward the video on demand channel content to the location of the requesting device through the second metro aggregation router without requesting a second stream of the video on demand channel content from a video on demand server.

2. The method of claim 1, wherein the first edge aggregation device receives the video on demand channel content in a first stream from a video on demand server, and wherein the first edge aggregation device forwards the video on demand channel content to the location of the requesting device without requesting a second stream of the video on demand channel content from the video on demand server.

3. The method of claim 1, comprising dynamically updating the index stored at the asset mapper device.

4. An apparatus comprising:
a memory; and
a processor coupled to the memory and operable to:
receive a request from a requesting device for video on demand channel content;
search an index to locate the video on demand channel content;
identify a location of the requesting device with respect to a first edge aggregation device; and
instruct the first edge aggregation device to forward the video on demand channel content to the location of the requesting device; wherein when the location of the requesting device is downstream of the second edge aggregation device and the first edge aggregation device is downstream of a first metro aggregation router and the second edge aggregation device is downstream of a second metro aggregation router, the processor is operable to instruct the first edge aggregation device to forward the video on demand channel content to the location of the requesting device through the second metro aggregation router without requesting a second stream of the video on demand channel content from a video on demand server.

5. The apparatus of claim 4, wherein the first edge aggregation device receives the video on demand channel content in a first stream from a video on demand server, and wherein the first edge aggregation device forwards the video on demand channel content to the location of the requesting device without requesting a second stream of the video on demand channel content from the video on demand server.

6. The apparatus of claim 4, wherein the index is stored at an asset mapper device.

7. The apparatus of claim 4, wherein the index is stored at the first edge aggregation device.

8. The apparatus of claim 4, wherein when the location of the requesting device is downstream of a second edge aggregation device, the processor is operable to instruct the first edge aggregation device to forward the video on demand channel content to the location of the requesting device through a first metro aggregation switch, wherein the first edge aggregation device and the second edge aggregation device are downstream of the first metro aggregation switch.

9. The apparatus of claim 4, wherein the processor is operable to request a separate multicast video on demand channel content stream from a video on demand server subsequent to receiving the request.

10. A non-transitory computer-readable storage medium comprising computer instructions for causing a computing device to:
   receive a request from a requesting device for video on demand channel content;
   identify a location of the requesting device with respect to a first edge aggregation device;
   search an index to locate the video on demand channel content; and
   instruct the first edge aggregation device to forward the video on demand channel content to the location of the requesting device; wherein when the location of the requesting device is downstream of a second edge aggregation device and the first edge aggregation device is downstream of a first metro aggregation router and the second edge aggregation device is downstream of a second metro aggregation router, the computer instructions cause the computing device to instruct the first edge aggregation device to forward the video on demand channel content to the location of the requesting device through the second metro aggregation router without requesting a second stream of the video on demand channel content from a video on demand server.

11. The non-transitory computer-readable storage medium of claim 10, wherein the first edge aggregation device receives the video on demand channel content in a first stream from a video on demand server, and wherein the first edge aggregation device forwards the video on demand channel content to the requesting device without requesting a second stream of the video on demand channel content from the video on demand server.

12. The non-transitory computer-readable storage medium of claim 10, wherein the index is stored at an asset mapper device.

13. The non-transitory computer-readable storage medium of claim 10, wherein the index is stored at the first edge aggregation device.

14. The non-transitory computer-readable storage medium of claim 10, wherein the index is dynamically updated.

\* \* \* \* \*